(12) United States Patent
Cideciyan et al.

(10) Patent No.: US 9,666,225 B2
(45) Date of Patent: May 30, 2017

(54) EFFICIENT RECOVERY OF THE CODEWORD INTERLEAVE ADDRESS

(71) Applicant: International Business Machines Corporation, Armonk, NY (US)

(72) Inventors: Roy D. Cideciyan, Rueschlikon (CH); Simeon Furrer, Altdorf (CH); Robert A. Hutchins, Tucson, AZ (US); Mark A. Lantz, Adliswil (CH); Keisuke Tanaka, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/923,389

(22) Filed: Oct. 26, 2015

(65) Prior Publication Data

US 2017/0117014 A1    Apr. 27, 2017

(51) Int. Cl.
G11B 20/10       (2006.01)

(52) U.S. Cl.
CPC ............. G11B 20/10009 (2013.01); *G11B 2020/10916* (2013.01)

(58) Field of Classification Search
CPC ............. G11B 20/10009; G11B 2020/10916
See application file for complete search history.

(56) References Cited

U.S. PATENT DOCUMENTS

| | | | |
|---|---|---|---|
| 6,640,326 B1 * | 10/2003 | Buckingham | G11B 20/1833 714/769 |
| 7,831,869 B2 | 11/2010 | Hana et al. | |
| 8,335,968 B1 | 12/2012 | Schelstraete | |
| 8,910,012 B2 | 12/2014 | Blaum et al. | |
| 9,007,709 B2 | 4/2015 | Cideciyan et al. | |
| 9,064,541 B2 | 6/2015 | Cideciyan et al. | |
| 2003/0026020 A1 | 2/2003 | Buckingham | |
| 2004/0168024 A1 | 8/2004 | Buckingham | |
| 2009/0164867 A1 | 6/2009 | Gray | |
| 2010/0185914 A1 | 7/2010 | Tan et al. | |
| 2014/0355151 A1 | 12/2014 | Cideciyan et al. | |
| 2015/0015982 A1* | 1/2015 | Cideciyan | G11B 5/00813 360/40 |
| 2015/0085393 A1 | 3/2015 | Cideciyan et al. | |
| 2015/0155003 A1 | 6/2015 | Cideciyan et al. | |

OTHER PUBLICATIONS

Anonymous, "Expanded Sub Data Set for Magnetic Tape Recording," IP.com, Nov. 13, 2012, pp. 1-5.

* cited by examiner

*Primary Examiner* — April Y Blair
*Assistant Examiner* — Rong Tang
(74) *Attorney, Agent, or Firm* — Zilka-Kotab, P.C.

(57) ABSTRACT

In one embodiment, a system includes a data processing unit configured to read encoded data from a magnetic tape medium. The data processing unit is also configured to decode a plurality of codeword interleaves (CWIs) from the encoded data, each CWI being a row in a sub data set logically organized into a two-dimensional array. The array includes a predetermined number of rows and columns of predetermined lengths. The data processing unit is also configured to determine an address for a first-written CWI without successfully decoding a corresponding codeword interleave designation (CWID) from the encoded data, each CWID specifying an address for a corresponding CWI. Also, each CWID is calculated as a function of a logical track number and a CWI set number.

25 Claims, 9 Drawing Sheets

FIG. 5

EFFICIENT RECOVERY OF THE CODEWORD INTERLEAVE ADDRESS

BACKGROUND

The present invention relates to tape storage systems, and more specifically, to efficient recovery of the codeword interleave address during decoding operations.

The smallest unit of appending or overwriting data onto magnetic tape when writing data to tape is not interrupted is referred to as a data set (DS). Each DS includes a number of sub data sets (SDS), typically in a range from 32 to 64 SDS in conventional tape technology. A SDS row that consists of 4 byte-interleaved C1 codewords is referred to as a codeword interleave (CWI-4). Each CWI-4 (a SDS row) has an address associated with the CWI-4 that specifies the SDS number within the DS along with the row number within the SDS.

This address is critical for iterative decoding of C1/C2 product codes, and is referred to as a CWI-4 designation (CWID), which is an integral part of a header that is stored with each CWI-4, such as a 12-byte CWI-4 header. However, CWI-4 headers typically have the weakest data integrity in terms of error correction code (ECC) decoding of data for several reasons.

A first reason that CWI-4 headers and CWID have weak data integrity is that protection of CWI-4 headers typically rely either on C1' encoding, which enhances C1 encoding by adding header fragments to the payload of C1 codewords and modifying C1 parity accordingly, on header interpolation, or both. However, both approaches provide relatively weak protection for the CWI-4 headers when compared to the protection of information by a C1/C2 product code. Another reason that CWI-4 headers have weak data integrity is that CWI-4s are typically written into a synchronous dynamic random access memory (SDRAM) buffer only when the cyclic redundancy check (CRC) stored in a header checks out appropriately (e.g., a DRAM address for the CWI-4 is able to be generated). This is undesirable for iterative decoding because the corresponding SDS row is erased when the CRC stored in a CWI-4 header fails.

Failure to decode a DS (permanent error leading to data loss) due to weak protection of CWI-4 headers is a problem that should be avoided, but known solutions only partially address the problem or have severe drawbacks.

SUMMARY

In one embodiment, a system includes a data processing unit configured to read encoded data from a magnetic tape medium. The data processing unit is also configured to decode a plurality of codeword interleaves (CWIs) from the encoded data, each CWI being a row in a sub data set logically organized into a two-dimensional array. The array includes a predetermined number of rows and columns of predetermined lengths. The data processing unit is also configured to determine an address for a first-written CWI without successfully decoding a corresponding codeword interleave designation (CWID) from the encoded data, each CWID specifying an address for a corresponding CWI. Also, each CWID is calculated as a function of a logical track number and a CWI set number.

In another embodiment, a method for determining an address for decoded data includes reading encoded data from a magnetic tape medium using a data processing unit of a magnetic tape drive. The method also includes decoding a plurality of CWIs from the encoded data, each CWI being a row in a sub data set logically organized into a two-dimensional array. The array includes a predetermined number of rows and columns of predetermined lengths. Moreover, the method includes determining an address for a first-written CWI without successfully decoding a corresponding CWID from the encoded data, each CWID specifying an address for a corresponding CWI. Also, each CWID is calculated as a function of a logical track number and a CWI set number, each CWI comprises four interleaved codewords (a CWI-4), and the CWIs are read from the magnetic tape in CWI sets that include a plurality of CWIs belonging to a data set.

In another embodiment, a computer program product for determining an address for decoded data includes a computer readable storage medium having program instructions embodied therewith. The embodied program instructions are executable by a controller to cause the controller to read encoded data from a magnetic tape medium using a data processing unit of a magnetic tape drive. The embodied program instructions are also executable by the controller to cause the controller to decode a plurality of CWIs from the encoded data, each CWI being a row in a sub data set logically organized into a two-dimensional array. The array includes a predetermined number of rows and columns of predetermined lengths. Also, the embodied program instructions are executable by the controller to cause the controller to determine an address for a first-written CWI without successfully decoding a corresponding CWID from the encoded data, each CWID specifying an address for a corresponding CWI. Moreover, each CWID is calculated as a function of a logical track number and a CWI set number. In addition, each CWI comprises a CWI-4, and the CWIs are read from the magnetic tape in CWI sets including a plurality of CWIs belonging to a data set.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 5 shows an exemplary tape layout with an allocation of codeword interleave designations (CWIDs) of first-written codeword interleaves (CWIs) in a data set to logical tracks, according to one embodiment.

DETAILED DESCRIPTION

Figure 1:
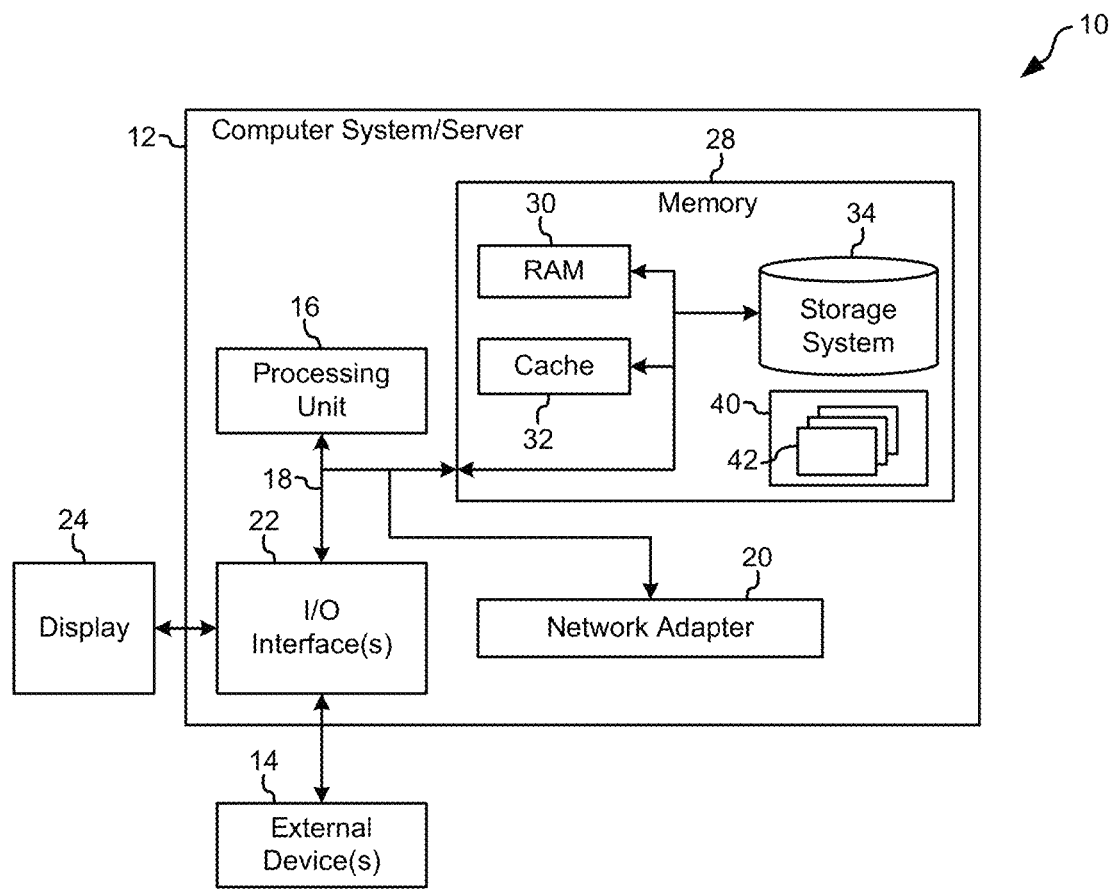
FIG. 1 illustrates a network storage system, according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "about" as used herein indicates the value preceded by the term "about," along with any values reasonably close to the value preceded by the term "about," as would be understood by one of skill in the art. When not indicated otherwise, the term "about" denotes the value preceded by the term "about"±10% of the value. For example, "about 10" indicates all values from and including 9.0 to 11.0.

The following description discloses several preferred embodiments of systems, methods, and computer program products for managing data and resources in a data storage system, such as a tiered data storage system.

In one general embodiment, a system includes a data processing unit configured to read encoded data from a magnetic tape medium. The data processing unit is also configured to decode a plurality of codeword interleaves (CWIs) from the encoded data, each CWI being a row in a sub data set logically organized into a two-dimensional array. The array includes a predetermined number of rows and columns of predetermined lengths. The data processing unit is also configured to determine an address for a first-written CWI without successfully decoding a corresponding codeword interleave designation (CWID) from the encoded data, each CWID specifying an address for a corresponding CWI. Also, each CWID is calculated as a function of a logical track number and a CWI set number.

In another general embodiment, a method for determining an address for decoded data includes reading encoded data from a magnetic tape medium using a data processing unit of a magnetic tape drive. The method also includes decoding a plurality of CWIs from the encoded data, each CWI being a row in a sub data set logically organized into a two-dimensional array. The array includes a predetermined number of rows and columns of predetermined lengths. Moreover, the method includes determining an address for a first-written CWI without successfully decoding a corresponding CWID from the encoded data, each CWID specifying an address for a corresponding CWI. Also, each CWID is calculated as a function of a logical track number and a CWI set number, each CWI comprises four interleaved codewords (a CWI-4), and the CWIs are read from the magnetic tape in CWI sets that include a plurality of CWIs belonging to a data set.

In another general embodiment, a computer program product for determining an address for decoded data includes a computer readable storage medium having program instructions embodied therewith. The embodied program instructions are executable by a controller to cause the controller to read encoded data from a magnetic tape medium using a data processing unit of a magnetic tape drive. The embodied program instructions are also executable by the controller to cause the controller to decode a plurality of CWIs from the encoded data, each CWI being a row in a sub data set logically organized into a two-dimensional array. The array includes a predetermined number of rows and columns of predetermined lengths. Also, the embodied program instructions are executable by the controller to cause the controller to determine an address for a first-written CWI without successfully decoding a corresponding CWID from the encoded data, each CWID specifying an address for a corresponding CWI. Moreover, each CWID is calculated as a function of a logical track number and a CWI set number. In addition, each CWI comprises a CWI-4, and the CWIs are read from the magnetic tape in CWI sets including a plurality of CWIs belonging to a data set.

Referring now to FIG. 1, a schematic of a network storage system 10 is shown according to one embodiment. This network storage system 10 is only one example of a suitable storage system and is not intended to suggest any limitation as to the scope of use or functionality of embodiments of the invention described herein. Regardless, network storage system 10 is capable of being implemented and/or performing any of the functionality set forth hereinabove.

In the network storage system 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in the network storage system 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 may include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 may be provided for reading from and writing to a non-removable, non-volatile magnetic media—not shown and typically called a "hard disk," which may be operated in a HDD. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided. In such instances, each may be connected to bus 18 by one or more data media interfaces. As will be further depicted and described below, memory 28 may include at least one program product having a set (e.g., at least one) of program modules that are configured to carry out the functions of embodiments described herein.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication may occur via Input/Output (I/O) interfaces 22. Still yet, computer system/server 12 may communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, redundant array of independent disks (RAID) systems, tape drives, and data archival storage systems, etc.

Figure 2:
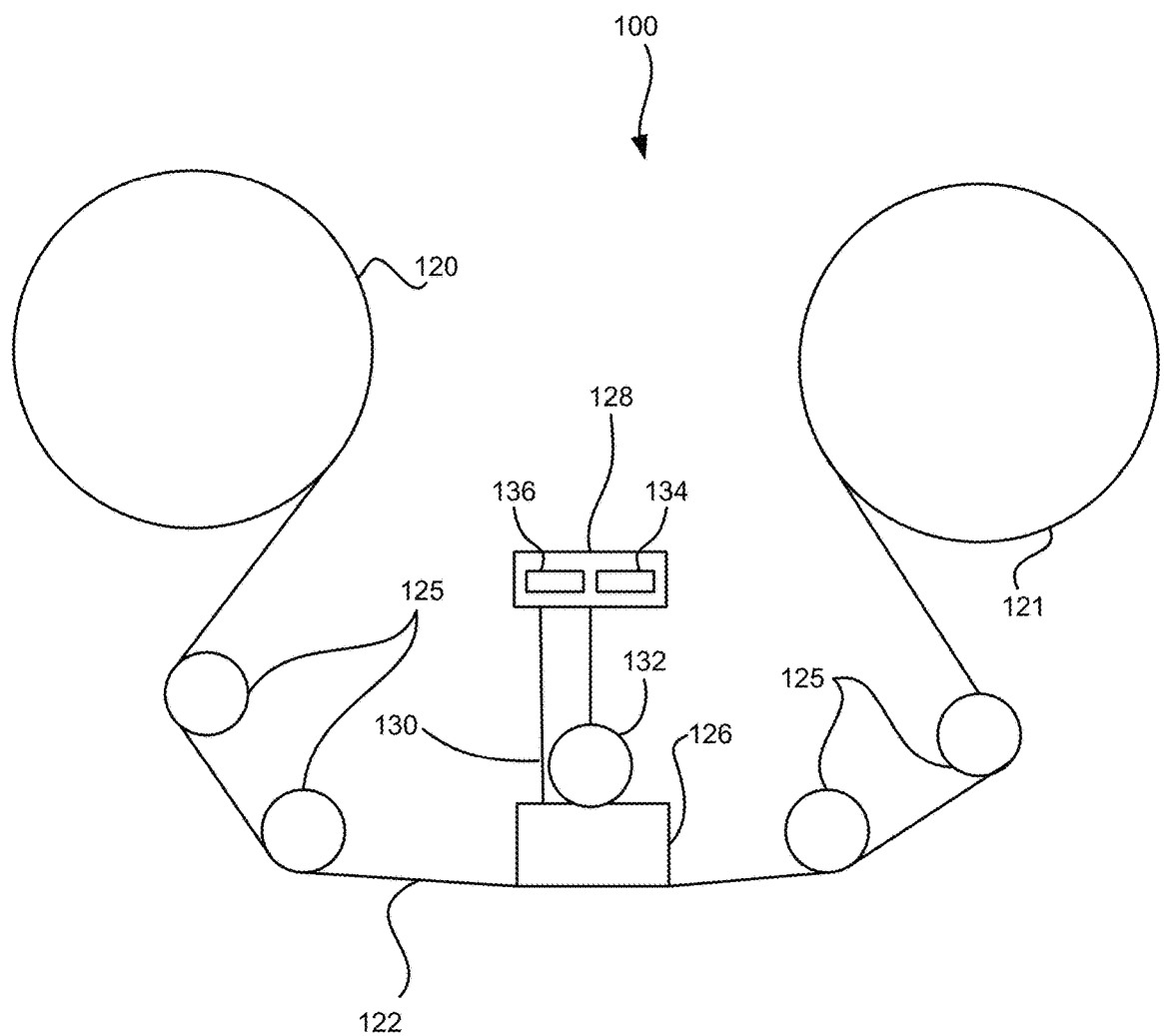
FIG. 2 illustrates a simplified tape drive of a tape-based data storage system, according to one embodiment.

FIG. 2 illustrates a simplified tape drive 100 of a tape-based data storage system, which may be employed according to various embodiments. While one specific implementation of a tape drive is shown in FIG. 2, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the system 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 3:
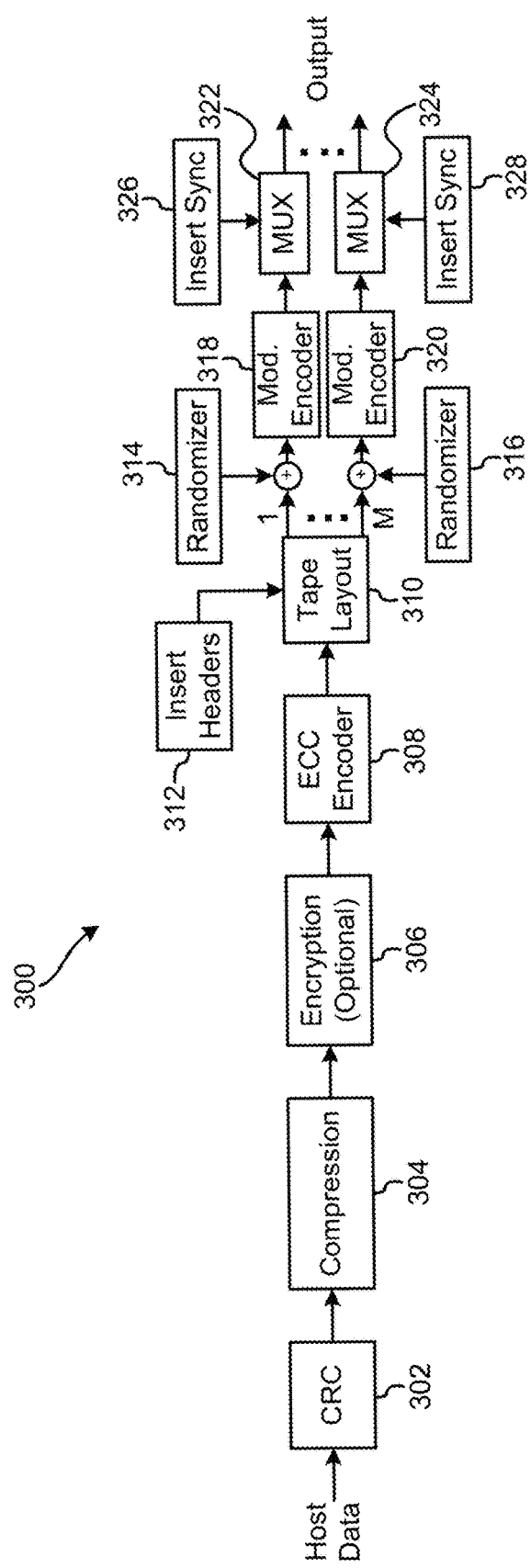
FIG. 3 illustrates a conceptual data flow in a tape drive in accordance with one embodiment.

FIG. 3 shows, in detailed form, a conceptual data flow 300 in a tape drive with M simultaneously written tracks via M write channels. The data flow 300 includes passing host data through a cyclic redundancy check (CRC) error detection encoder 302, a compression module 304, an optional encryption module 306, an error correction code (ECC) encoder 308 (which includes a C1 encoder and a C2 encoder, arranged as C1/C2, or C2/C1), and a tape layout module 310, according to one embodiment. The header insertion module 312 may be positioned as shown, feeding into the tape layout module 310, or may be positioned feeding into the ECC encoder 308, thereby allowing the headers to receive some amount of ECC encoding, in one embodiment. The tape layout module 310 splits the data into individual feeds for each channel 1, . . . , M to write to the tracks of the tape medium. The data flow 300 also includes scrambling the data (data randomization) 314, . . . , 316, modulation encoding 318, . . . , 320, synchronization insertion 326, . . . , 328, and multiplexing 322, . . . , 324 for each simultaneously written track 1, . . . , M.

In the following descriptions, most of these operations are not shown, in order to simplify descriptions. However, any of the descriptions herein may include additional operations not depicted, as would be understood by one of ordinary skill in the art upon reading the present descriptions. The number of tracks that may be written simultaneously depends on the tape drive being used, with the value of M ranging from 1 to 64 or more.

There are typically five types of overhead associated with writing data to tape, ECC, modulation encoding, insertion of headers, insertion of synchronization patterns, and rewriting the data following a read-while-write operation. All first-written data (data which is not re-written) typically achieves approximately 79% format efficiency, i.e., out of every 100 bits written onto tape, only 79 bits correspond to user data (data input to the ECC encoder 308). The remaining bits correspond to some form of protection, redundancy, parity, etc. In addition, typically about 3% of each tape medium is reserved for rewritten data.

Figure 4:
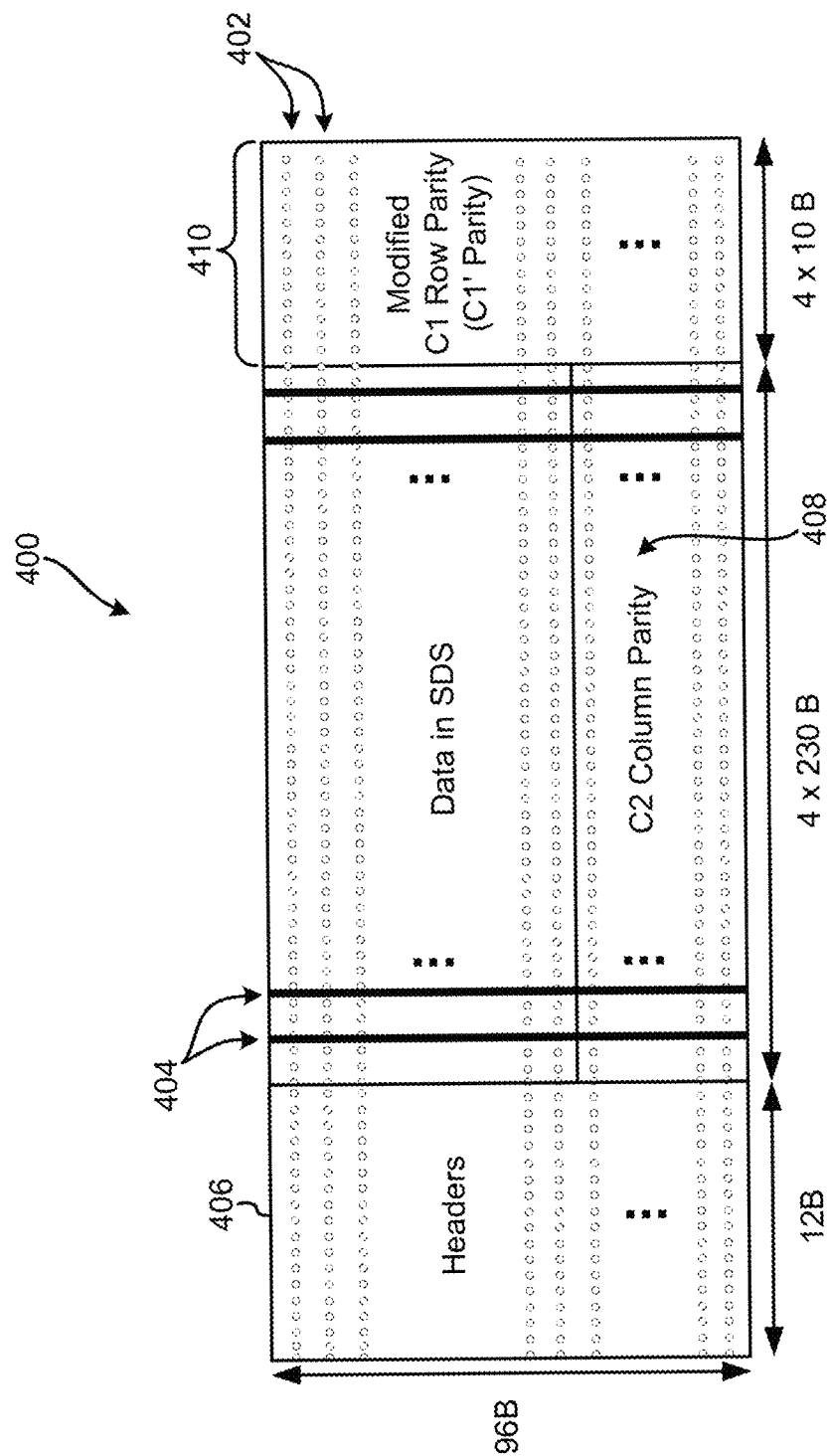
FIG. 4 shows a logical data array that may be used to organize data in a sub data set (SDS), according to one embodiment.

FIG. 4 shows a logical data array 400 that may be used to organize data in a sub data set (SDS), according to one embodiment. As shown, the data array includes a plurality of rows 402 and columns 404. Each row 402 in the data array 400 is a codeword interleave (CWI) that includes a plurality of C1 codewords. When the CWI includes four interleaved codewords, it is referred to as a CWI-4. The data in the SDS is protected by C1 encoding across each row 402 to produce C1 row parity (not shown as it is modified later to produce the data array 400), and by C2 encoding across each column 404 to produce C2 column parity 408.

As shown, the headers 406 for each row 402 may be encoded using a C1' encoding scheme by modifying the C1 parity (computed for the data in the row 402 only) to account for the headers 406 to produce C1' parity 410. In this embodiment, the headers 406 are protected by one-level ECC (C1' parity 410 only), whereas the data is protected by two-level ECC (C1' parity 410 and C2 parity 408).

Each data set includes multiple sub data sets and each sub data set may be represented by a logical two-dimensional array. Usually hundreds of headers are assigned to a single data set because each data set includes multiple SDSs and each row (CWI) of a column-encoded SDS is assigned a header.

In typical tape drives, e.g., linear tape open (LTO) and enterprise tape drives, the address for locating a CWI is obtained by decoding the header for the CWI. However, the headers are weakly protected (only by one-level), and therefore in this scheme, the CWI address cannot be obtained in the presence of header errors (typically detected by header CRC).

CWI headers are the weakest link in the provision of data integrity via ECC decoding of data because: 1) there is weak protection of CWI headers provided by C1' code and/or header interpolation, and 2) CWIs are typically written into the buffer, such as a synchronous dynamic random access memory (SDRAM), only in response to the CRC stored in a header checking out correctly (the buffer address for the CWI is able to be generated), which is undesirable for iterative decoding because the corresponding SDS row is erased in response to the CRC stored in a CWI header failing the check. Failure to decode a DS (permanent error leading to data loss) due to weak protection of CWI headers is a problem that should be avoided.

Each CWI (SDS row) has an address associated with it specifying the SDS number within the DS and the row number within the SDS. This address is critical for iterative decoding of C1/C2 product codes, and is referred to as a CWI designation (CWID), which is an integral part of a CWI header. Each CWI header may have a length that is determined based on the length of the CWI. For example, for CWIs that include 4 byte-interleaved codewords (CWI-4), the CWI header may be 12-bytes in length, or more or less, depending on the level of protection and desired format efficiency.

Therefore, it is beneficial to obtain the address for a first-written CWI without requiring that the header be decoded successfully. In one embodiment, the CWID may be determined for first-written CWIs from the tape layout algorithm instead of obtaining the CWID by decoding the header associated with the CWI, which are weakly protected. On average, about 97% of CWIs written to tape are first-written CWIs, with the remaining being re-written. Therefore, the CWID determination techniques described herein in various embodiments applies to the large majority of CWIs stored to tape.

Data is stored to the magnetic tape medium according to a tape layout algorithm. The variables in this tape layout algorithm are now described. Assuming that there are N SDSs per data set (e.g. N=64) and M channels (e.g. M=32) in the tape drive, the CWID (represented by y) may be calculated as a function of the logical track number (represented by t) and the CWI set number (represented by c) as shown in Equation 1.

$$y = A + B + C \qquad \text{Equation 1}$$

In equation 1, A is calculated as N×floor(c/(N/M)), B is calculated as mod(mod(c,N/M)+mod(floor(c/L),N/M),N/M), and C is calculated as (N/M)×mod(t−R×floor(c/(N/M)), M). In Equation 1, t is the logical track number that may range from 0 to M−1, c is the CWI set number that may range from 0 to (N/M)L−1, y may range from 0 to NL−1, with R being a parameter that specifies track rotation between consecutive CWIs in an SDS, and L being the length of the C2 code in symbols.

Figure 5:
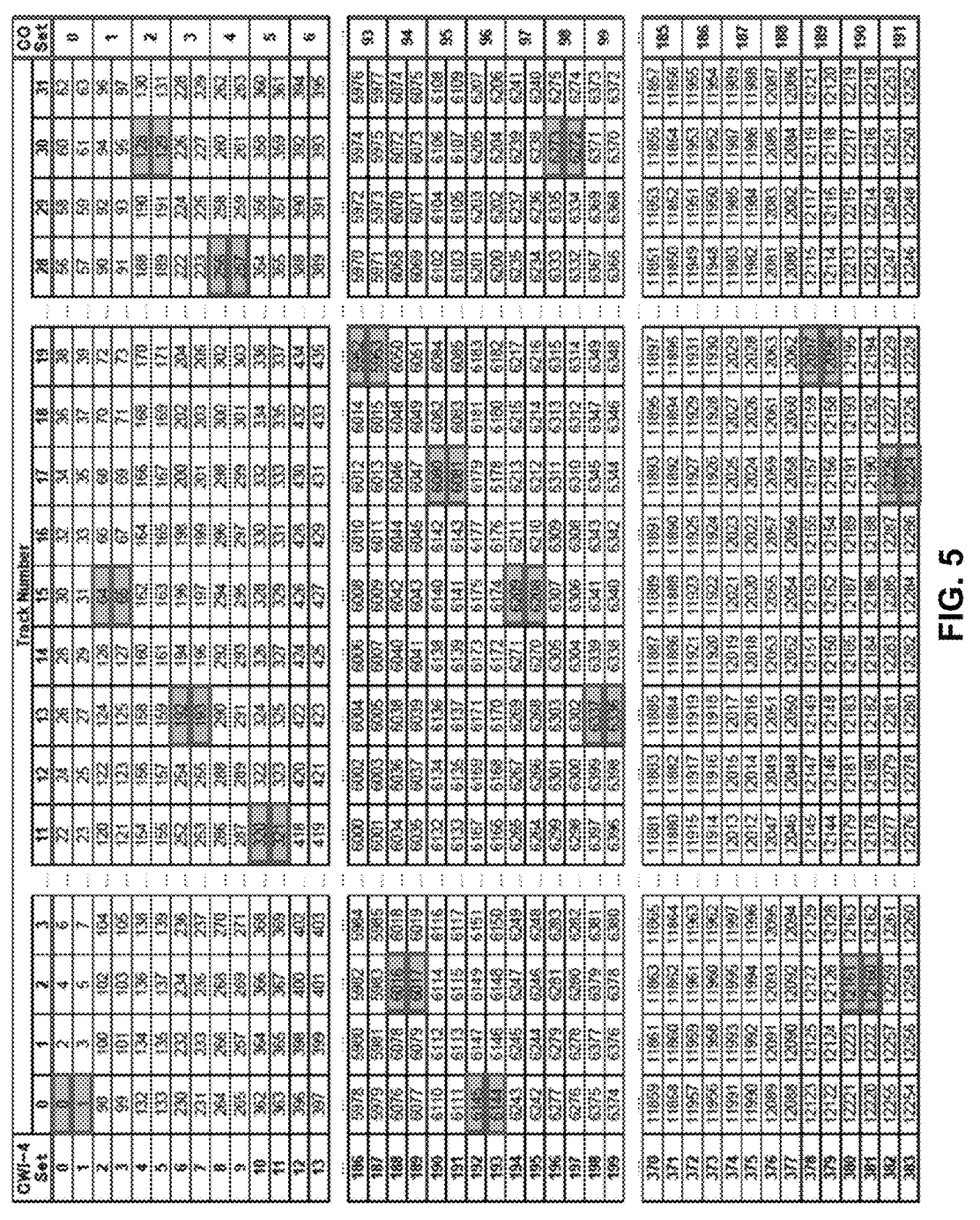

In one example: N=64, M=32, R=15, and L=192 for a logical format for use in a tape drive, according to one embodiment. This tape layout is shown in FIG. 5, an exemplary tape layout with an allocation of CWIDs of first-written CWIs in a data set to logical tracks, according to one embodiment. As shown in FIG. 5, the CWI set numbers are incremented by one after each M CWIs have been written to the tape, with M=32 for this embodiment. The number in each box indicates a CWID for the CWI that is written for this location. The CWID is represented by y in Equation 1, and may be calculated as a function of the logical track number (shown in FIG. 5 as 0 to 31) and the CWI set number associated with that CWID.

Equation 1 may be represented in Boolean logic to implement the tape layout algorithm as a p-bit to q-bit map as shown in Equations 2-3, where N=2M and M=$2^m$.

$$p = \text{ceiling}(\log 2(M)) + \text{ceiling}(\log 2(NL/M)) = m + \text{ceiling}(\log 2(2L)) \qquad \text{Equation 2}$$

$$q = \text{ceiling}(\log 2(NL)) = m + \text{ceiling}(\log 2(2L)) = p \qquad \text{Equation 3}$$

For the tape drive logical format described by Equation 1, the logical track number is represented as a 5-bit number ranging from 0 to 31, the CWI set number is represented as a 9-bit number ranging from 0 to 383, and therefore the CWID is represented as a 14-bit number ranging from 0 to 12287. Moreover, in one embodiment, the Boolean logic may implement the tape layout algorithm as a 14-bit to 14-bit map. For a given channel (logical track) number, the CWID (the address of the CWI) is obtained from a 9-bit to 14-bit map.

In another embodiment, it is possible to calculate, according to the mapping, the CWI set number, c, as a function of the CWID, y, as follows. y: CWID ranging from 0 to 12287;

c: CWI set number ranging from 0 to 383; Input: y (14-bit number): $y_{13}\, y_{12}\, y_{11}\, y_{10}\, y_9\, y_8\, y_7\, y_6\, y_5\, y_4\, y_3\, y_2\, y_1\, y_0$; Output: c (9-bit number): $c_8\, c_7\, c_6\, c_5\, c_4\, c_3\, c_2\, c_1\, c_0$.

According to the mapping discussed above, $c_8 = y_{13}$; $c_7 = y_{12}$; $c_6 = y_{11}$; $c_5 = y_{10}$; $c_4 = y_9$; $c_3 = y_8$; $c_2 = y_7$; $c_1 = y_6$; and $c_0 = y_0 \oplus (y_{13} + (y_{12} \cdot y_{11}))$, where $\oplus$ is XOR, $+$ is OR, $\cdot$ is AND. It is noted that in current tape layouts, $y_5$, $y_4$, $y_3$, $y_2$, and $y_1$ play no role in computing the CWI set number.

Figure 6A:
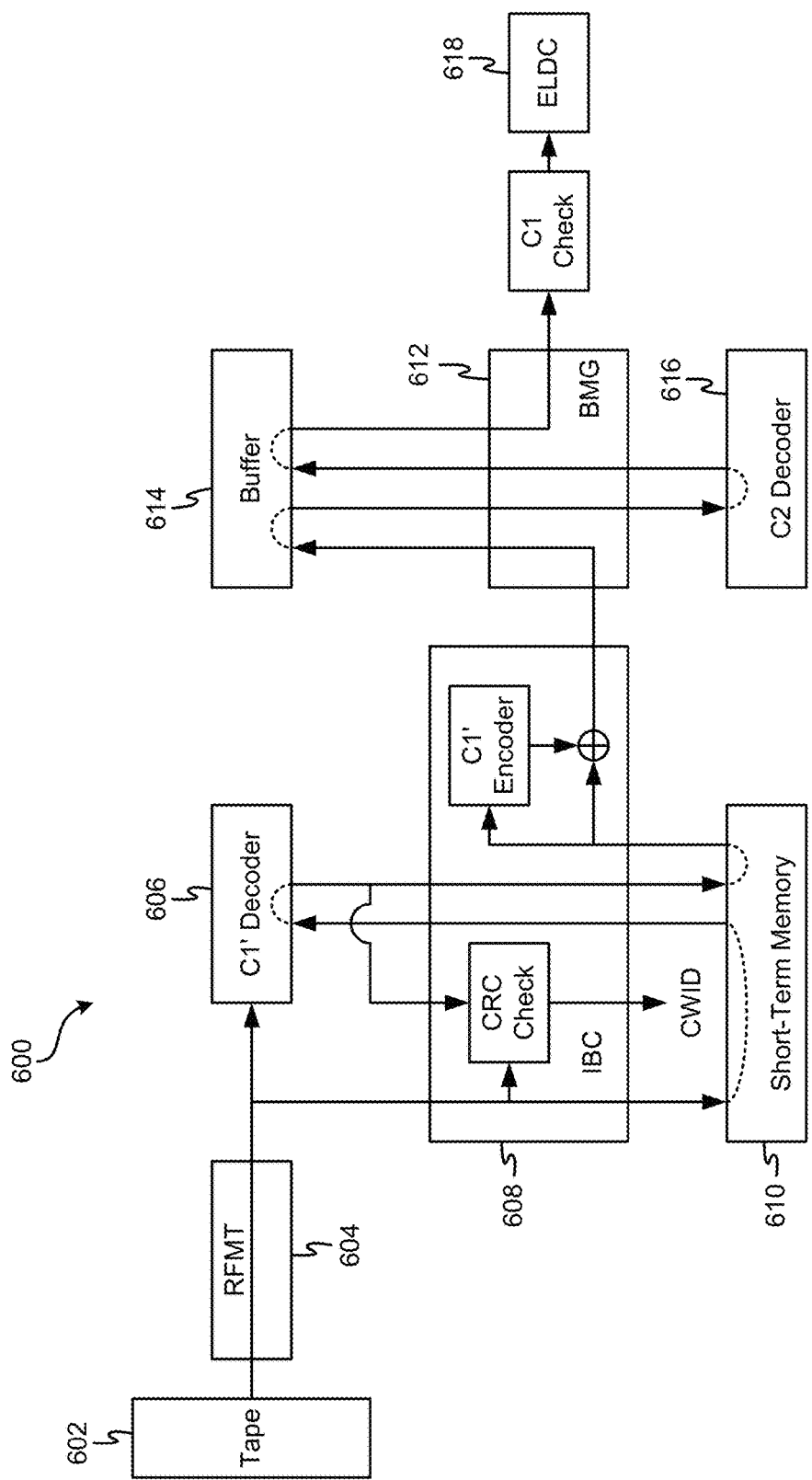
FIG. 6A shows a tape drive read-side data flow architecture, according to one embodiment.

Now referring to FIG. 6A, a tape drive read-side data flow architecture 600 is shown according to one embodiment. During a read operation, encoded data is read from the magnetic tape medium 602, processed by a number of read channels (not shown) and transferred via the read formatter 604 (RFMT), which also functions to remove synchronization patterns, decodes any modulation encoding, and descrambles the data, to the C1' decoder 606, to the interleaving buffer controller (IBC) 608, and to a short-term storage 610. The short-term storage 610 may comprise static RAM, or some other suitable memory type known in the art. Furthermore, the short-term storage 610 may be relatively small, such as 64 kB, 96 kB, etc., depending on the size of an entire codeword object (CO) set consisting of two CWI sets written to the magnetic tape medium being read.

At the C1' decoder 606, the encoded data is decoded to mark errors in the data, and to obtain decoded data and decoded headers, when the data is able to be corrected. Specifically, a plurality of CWIs are decoded from the encoded data, each CWI being a row in a sub data set logically organized into a two-dimensional array. Each data array comprises a predetermined number of rows and columns of predetermined lengths, as previously described.

From the C1' decoder 606, the data is sent to the short-term storage 610 where an entire codeword object (CO) set is assembled, once all codewords that comprise the CO set are successfully decoded. Data is retrieved from the short-term storage 610 to be used by the C1' decoder 606 and by the IBC 608 at various points in the data processing.

The IBC 608 also retrieves CWI headers from CWIs in the encoded data prior to the encoded data being decoded by the C1' decoder 606, in order to perform a header CRC operation on the CWI headers to determine whether the CWI headers pass CRC. When a CWI header passes CRC, and when the CWI header is decoded successfully or does not include any errors, an address for a CWI may be obtained from the CWI header.

Otherwise, the address (also referred to as a CWID) for a first-written CWI may be determined without successfully decoding a corresponding CWID from the encoded data based on the CWI set number calculated from other CWIs in a common CWI set and a logical track number that read the CWI, e.g., each CWID may be calculated as a function of the logical track number and the CWI set number associated with the CWID.

An initialization operation may be performed prior to determining the CWI set number for any particular CWI. This initialization procedure may include determining the CWI set number from CWI headers, storing the CWI set numbers in a CWI set number storage, and ensuring that at least a threshold number of CWI set numbers are determined in a consecutive order, prior to relying on the CWI set number determination for the particular CWI. The threshold number of consecutive CWI set numbers may be 2, 3, 4, 5, or more, in various embodiments. It is not advisable, but is possible, to rely on determining only one particular CWI set number, such as for use when special circumstances dictate it.

Once the CWID for each CWI has been determined, C1 codewords are transferred to the buffer manager (BMG) 612 which is configured to manage a buffer 614. Moreover, the BMG 612 is configured to store data in and retrieve data from the buffer 614, in order for C2 decoding to be performed by a C2 decoder 616. Once all codewords have been successfully decoded from the encoded data, the decoded data is sent to an enhanced lossless data compression module 618 for further processing and to be output.

The buffer 614 may be much larger than the short-term storage 610 in order to store entire SDSs and even one or more DSs. In one embodiment, the buffer 614 may be 1 GB, 2 GB, 3 GB, or more in size, and may comprise dynamic random access memory (DRAM), SDRAM, or some other suitable memory type known in the art.

Figure 6B:
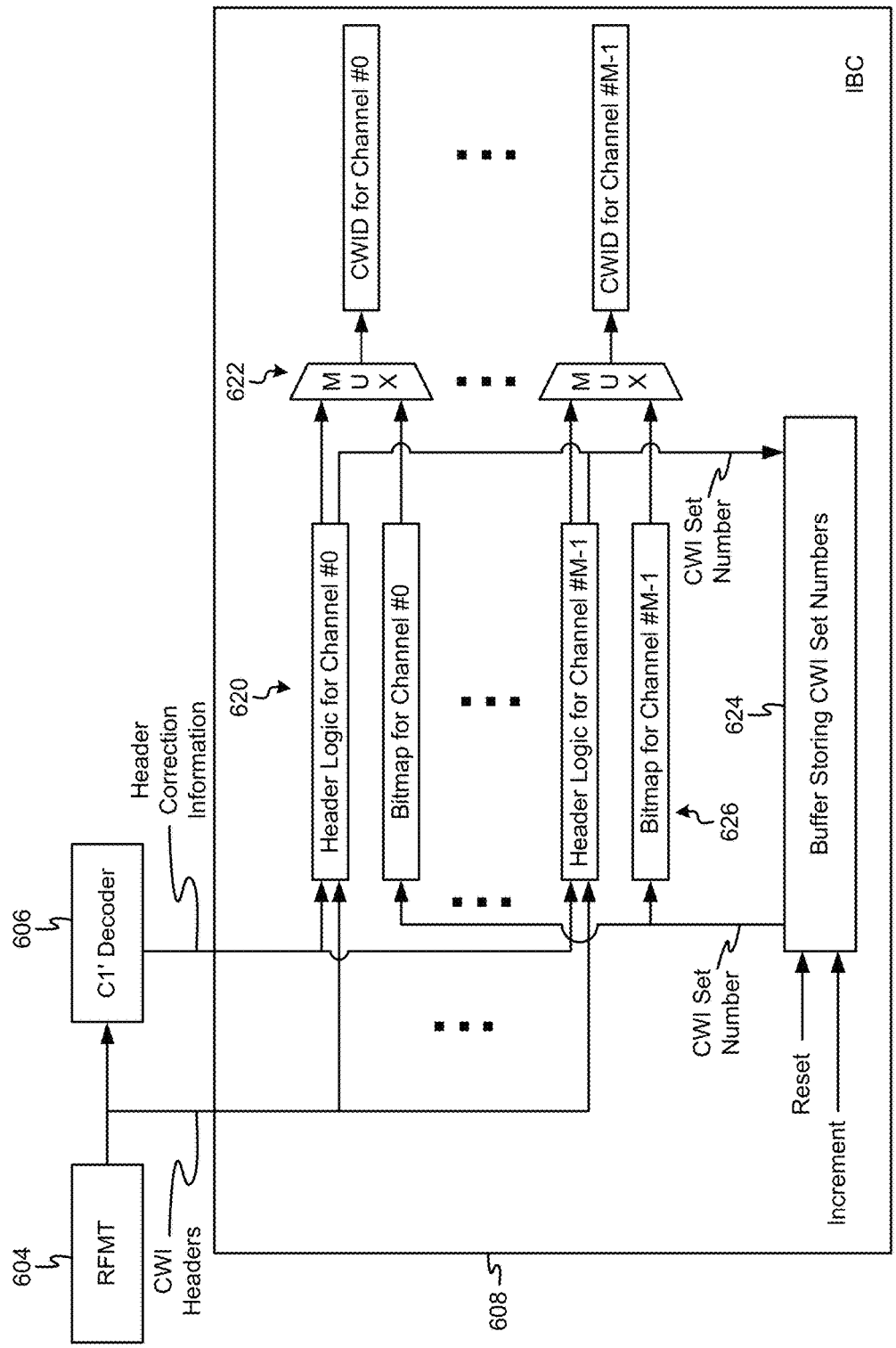
FIG. 6B shows components of the tape drive data flow architecture from FIG. 6A in greater detail, according to one embodiment.

Now referring to FIG. 6B, components of the tape drive read-side data flow architecture 600 from FIG. 6A are shown in greater detail, according to one embodiment. Referring again to FIG. 6B, C1' codewords including 3-byte CWI header fragments are received from the RFMT 604 at the IBC 608. The C1' decoder 606 generates error correction information associated with C1' codewords from the encoded data read from the magnetic tape medium. In the IBC 608, CWI header CRC is checked after C1' decoding results are received from the C1' decoder 606, thereby determining whether the CWI header is viable.

In the case of C1' decoding failure, wherein at least one C1' codeword in a CWI fails to decode, an uncorrected CWI header is used at the input to the IBC 608 to check for CRC. In the case that the CWI is a CWI-4, then an uncorrected CWI-4 header may include 3, 6, 9, or 12 uncorrected CWI header bytes depending on whether 1, 2, 3, or 4 header fragments have been not corrected as a result of C1' decoding failures of 1, 2, 3, or 4 codewords in a CWI-4, respectively.

In the case of C1' decoding success, in which all C1' codewords in a CWI are corrected successfully, all header fragments of the uncorrected CWI header are corrected in the IBC 608 using header logic for each individual channel 620 obtained from the C1' decoder 606 and this corrected CWI header is used in the IBC 608 to check for CRC.

In another embodiment, an original CWI header with no errors therein may be used in response to there being no C1' miscorrections in the CWI or C1' miscorrections not having an impact on the header fragments. Note that C1' decoding success does not guarantee that a C1' codeword has no errors. Instead, in rare cases, a C1' miscorrection may occur in the case of successful decoding. Successful decoding just indicates that the decoder was able to correct errors and produced a corrected codeword. However, it does not indicate or guarantee that the corrected codeword is the original codeword as written to tape. Therefore, it is important to check for header CRC even in response to all C1' codewords having been successfully decoded to rule out C1' miscorrection of header fragments.

In response to no CRC error being determined as a result of the CRC check of either the uncorrected or corrected CWI header, the CWID is extracted from the CWI header, and the IBC 608 sends the header and data to the BMG 612, which stores the header and data to the buffer 614 based on the determined CWID.

In response to CRC error being determined as a result of CRC check, there are several steps that may be taken. One option is to discard the header and data without sending it to the BMG 612. However, this option is undesired.

In one embodiment, for first-written CWIs, the IBC 608 is configured to obtain the CWI set number associated with the CWI from a CWI set number storage 624, and generate the CWID using a bitmap for each individual channel 626 corresponding to the CWI based on the CWI set number and a channel number which was used to read the CWI from the magnetic tape medium. Then, a multiplexer 622 for each individual channel is used to select the determined CWID to be output. Then, the data and header may be output to the BMG 612 to be stored to the buffer 614 according to the determined CWID, e.g., the CWI and the corresponding CWID are output. This process may be used for all CWIs when no errors are detected during a CRC check.

In the case of a rewritten CWI, the CWID for a rewritten CWI is not able to be generated using the CWI set number obtained from the CWI set number storage 624. In this case, the associated CWID is generated in the IBC 608 using a decoded header obtained from the C1' decoder 606.

Moreover, for first-written CWIs, in response to failing the CRC check, the IBC 608 is configured to erase C1 parity bytes associated with a first-written CWI for which the CRC check failure occurred in one embodiment. The C1 parity bytes are erased prior to C2 decoding.

In one embodiment, in response to failing the CRC check, the IBC 608 is configured to generate a CWI header for the first-written CWI based on the corresponding CWID, and compute C1 parity associated with the first-written CWI from the generated CWI header. Thereafter, C1' parity obtained from the first-written CWI is overwritten with the C1 parity.

When a CRC check failure is detected for a header of a rewritten CWI, the header and data associated with the rewritten CWI is discarded without sending the header and data to the BMG 612 to be stored to the buffer 614 according to another embodiment.

Figure 7:
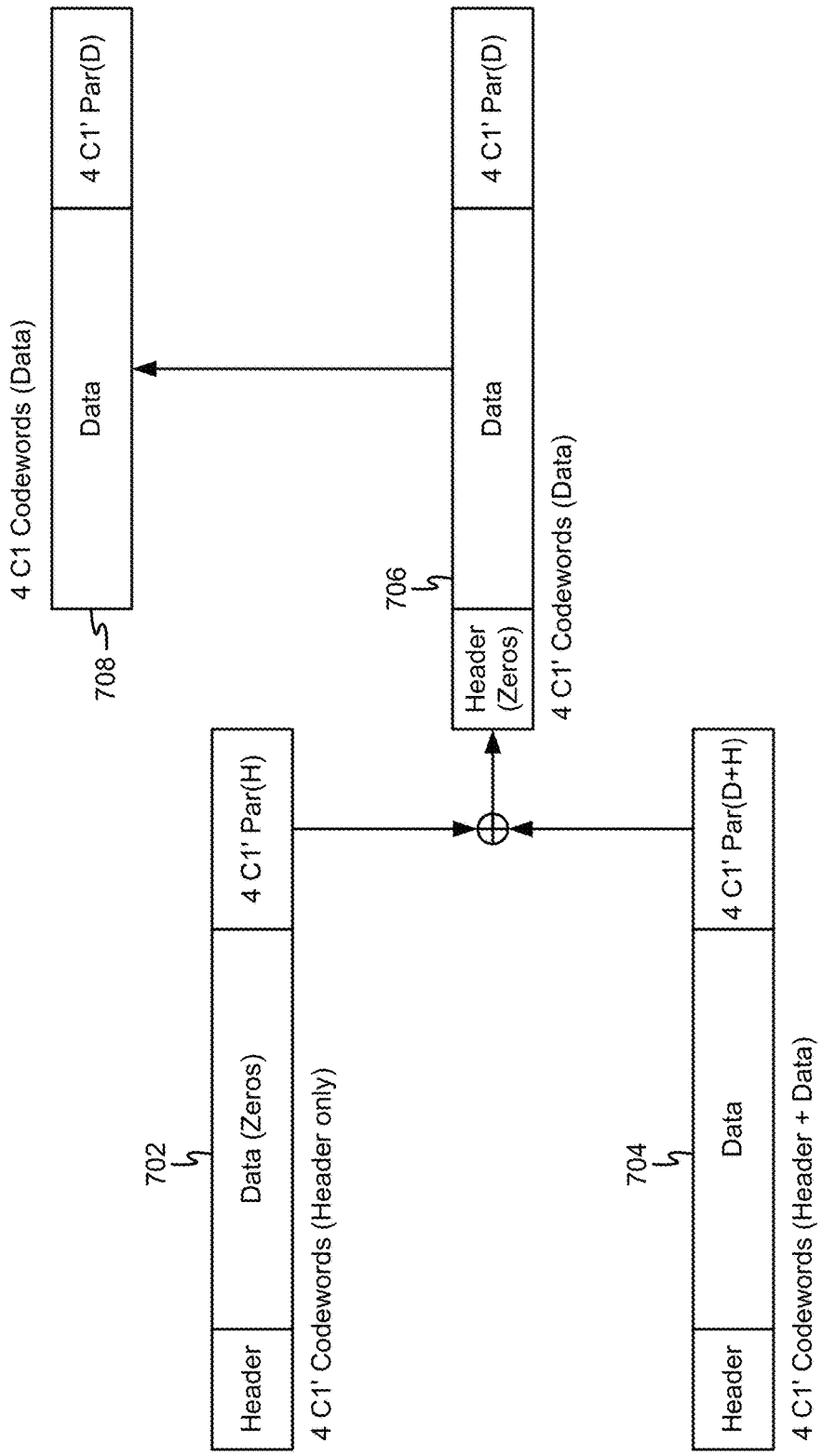
FIG. 7 shows the data as it progresses through the tape drive data flow architecture shown in FIG. 6B, according to one embodiment.

Now referring to FIG. 7, the data is shown as it progresses through the tape drive read-side data flow architecture 600 shown in FIG. 6A. Referring again to FIG. 7, block 702, representing four C1' codewords which protect the headers only, is used in conjunction with block 704, representing four C1' codewords which protect both data and headers, to form block 706, representing four C1' codewords which protect the data only, e.g., the headers are stripped from the C1' codewords.

In one embodiment, C1' header parity, C1' Par(H), may be obtained by feeding a C1' Reed-Solomon (RS) encoder feedback shift register circuitry with a 3 byte (B) header fragment followed by 234 zero bytes (representing the data portion), where the resulting content of the feedback shift register is C1' Par(H). Therefore, to obtain C1' parity for the data portion, C1' Par(D), the following equation may be used: C1' Par(D)=C1' Par(D+H)+C1' Par(H), due to the linearity property of RS codes. Furthermore, as can be seen from blocks 706 and 708, C1 Par(D)=C1' Par(D).

As shown, block 702 includes zeroes for the data portion of the C1' codewords, indicating that no data is stored therein. Moreover, block 706 includes zeroes for the header portion of the C1' codewords, indicating that no header information is stored therein.

In one embodiment, the information portion of the blocks may have 237 bytes (B) of data corresponding to 3 header bytes from the header portion and 234 data bytes from the data portion; however, any amount of data may be stored in the information portion of the blocks as would be understood by one of skill in the art upon reading the present descriptions. Additionally, in one embodiment, the header portion of the blocks may have 12B of header data; however, any amount of header data may be stored in the header portion of the blocks as would be understood by one of skill in the art upon reading the present descriptions.

After obtaining block 706, this block having four C1' codewords protecting the data only may be modified to become block 708, which represents four C1 codewords (data only) without the header portion of the C1' codewords.

In one embodiment, the C1 Code is a RS code with the following characteristics: RS(N1=246,K1=234) with 12B parity. Also, in this embodiment, the C1' Code is a lengthened C1 Code with the following characteristics: RS(N1+3=249,K1+3=237) with 12B parity. The linear characteristic of RS codes may be used, in some embodiments, to generate C1' codewords from C1 codewords, and vice versa. As far as the parity is concerned, C1 and C1' Parity associated with four codewords (12B per codeword) may be 48B, in one approach, or more or less, in other approaches.

In other embodiments, different RS codes may be used for the C1 code and the C1' code, longer or shorter headers may be used for the codewords, and more or less parity bytes may be used for each of the codewords.

Figure 8:
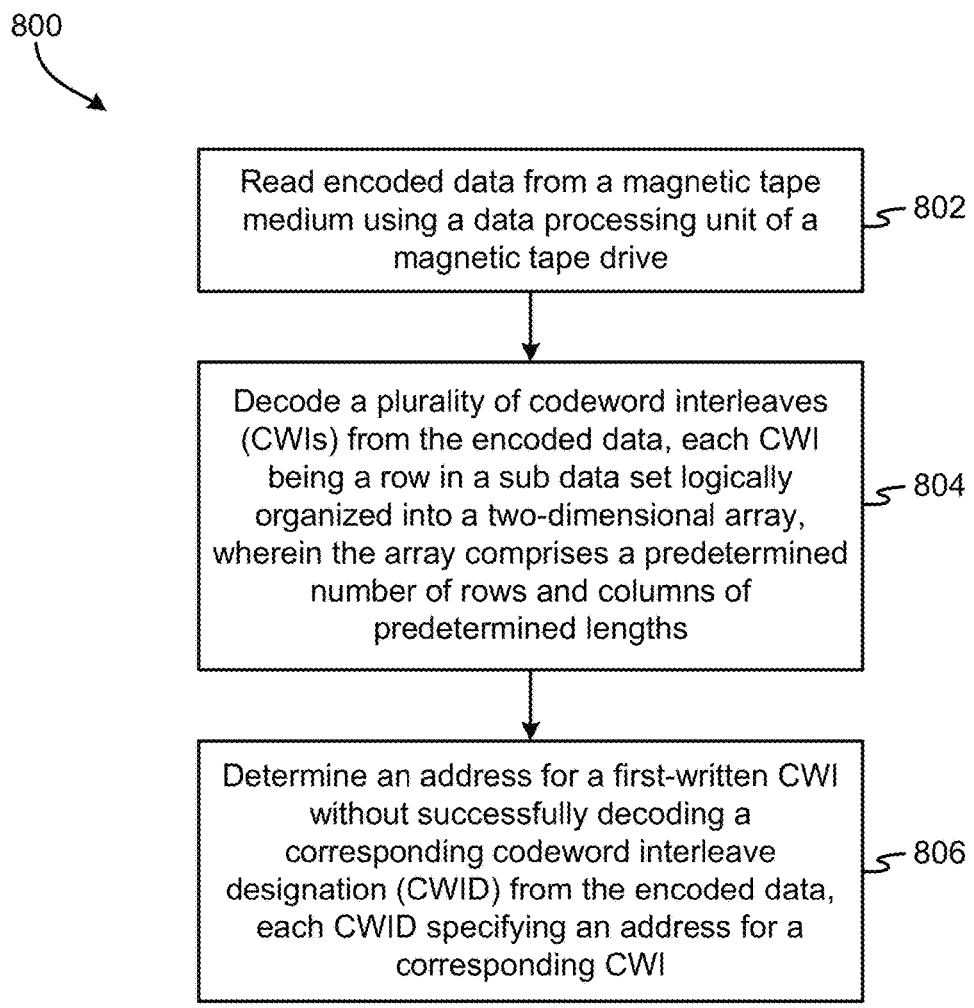
FIG. 8 shows a flowchart of a method according to one embodiment.

Now referring to FIG. 8, a flowchart of a method 800 is shown according to one embodiment. The method 800 may be performed in accordance with the present invention in any of the environments depicted in FIGS. 1-7, among others, in various embodiments. Of course, more or less operations than those specifically described in FIG. 8 may be included in method 800, as would be understood by one of skill in the art upon reading the present descriptions.

Each of the steps of the method 800 may be performed by any suitable component of the operating environment. For example, in various embodiments, the method 800 may be partially or entirely performed by a processor, an IBC, a tape drive, or some other device having one or more processors therein. The processor, e.g., processing circuit(s), chip(s), and/or module(s) implemented in hardware and/or software, and preferably having at least one hardware component, may be utilized in any device to perform one or more steps of the method 800. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 8, method 800 may initiate with operation 802, where encoded data is read from a magnetic tape medium using a data processing unit of a magnetic tape drive. The data processing unit may be referred to herein as a data flow, such as that shown in FIGS. 6A-6B, according to some embodiments. Moreover, the encoded data comprises CWIs, and is read from the magnetic tape in CWI sets comprising a plurality of CWIs.

Referring again to FIG. 8, in operation 804, a plurality of CWIs are decoded from the encoded data. Each CWI is a row in a sub data set logically organized into a two-dimensional array. This two-dimensional array comprises a predetermined number of rows and columns of predetermined lengths.

In operation 806, an address for a first-written CWI is determined without successfully decoding a corresponding CWID from the encoded data. Each CWID specifies an address for a corresponding CWI. Also, each CWID is calculated as a function of a logical track number and a CWI set number.

According to one embodiment, each CWI may comprise four interleaved codewords (a CWI-4).

The method 800, according to one embodiment, may include storing a CWI set number associated with a CWI set to which the first-written CWI belongs based on successfully decoding a CWI header of at least one CWI from the data set to which the first-written CWI belongs. In this way, the method may be initiated to be sure that a recovered CWI set number is accurate. In one embodiment, more than one CWI set number must be recovered in an anticipated order (such as successive, e.g., 31, 32, 33; the same set number, e.g., 31, 31, 31; at the end of a set number transitioning to a next set number, e.g., 31, 31, 32; etc.), before the CWI set number may be relied upon. After initialization, the CWI set number may be extrapolated for subsequently read CWIs, in one embodiment, and for previously read CWIs, in another embodiment.

In accordance with one embodiment, more than one CWI set number may be recovered that have an anticipated order according to the tape layout used to store the data to the magnetic tape, such as the same CWI set number more than one time in succession (e.g., 31, 31, 31).

This successful recovery of more than one CWI set number is performed before the CWI set number may be relied upon and used to extrapolate to determine CWI set numbers of the CWIs read after the initialization. The number of CWI set numbers that must be successfully recovered before the CWI set number may be relied upon, and initialization of the CWI set number storage is completed, may be adjusted to any value as desired, such as 1, 2, 3, 5, etc. Once initialization is completed, it does not have to be performed again while reading the same data set from the magnetic tape.

In a further embodiment, CWI set numbers may be extrapolated for CWIs read prior to initialization, as long as the previously read CWIs are stored to a memory, prior to being read out.

Moreover, after a predetermined number of CWIs (M) have been written to the tape, the CWI set number is incremented by one for the next set of CWIs written to the tape. Therefore, an anticipated CWI set number order may include different CWI set numbers (e.g., 31, 31, 32), when the CWIs being read from the tape are located at the end of one CWI set number and continue to the beginning of the next CWI set number. This may also be an anticipated CWI set number order.

The anticipated order is determined based on the tape layout used to store the encoded data to the magnetic tape medium originally. Moreover, the CWI set number for the first-written CWI is stored in a CWI set number storage accessible to the processor. The CWI set number storage may be a buffer, a register, or some other known memory type suitable for storing small amounts of data that is easily accessible.

In another embodiment, the step of determining the address for the first-written CWI may include the following: obtaining the CWI set number associated with the first-written CWI from the CWI set number storage, generating a CWID corresponding to the first-written CWI based on the CWI set number and a channel number which was used to read the first-written CWI from the magnetic tape medium, and outputting the first-written CWI and the corresponding CWID. In this way, the CWID may be determined without decoding the CWID from a CWI header. Instead, the CWID is calculated based on the CWI set number and the channel number which was used to read the first-written CWI. The CWID may be calculated according to Equation 1, previously described, in one embodiment.

According to another embodiment, method 800 may include determining whether C1' decoding has produced error correction information associated with any of one or more C1' codewords of the first-written CWI, generating a CWID corresponding to the first-written CWI based on the CWI set number and a channel number which was used to read the first-written CWI from the magnetic tape medium, and outputting the first-written CWI and the corresponding CWID. C1' decoding may produce error correction information, which may be used to correct errors in the CWI, and in the CWI header.

In this embodiment, method 800 may also include, in response to a C1' decoding failure in any of the header fragments that form the CWI header: assembling an uncorrected CWI header from the header fragments associated with all of the one or more C1' codewords of the first-written CWI, and determining whether a cyclic redundancy check (CRC) error results from the C1' decoding of the uncorrected CWI header associated with the first-written CWI. Each CWI header has a predetermined number of bytes, such as 12 bytes in one embodiment. Each CWI has a predetermined number of codewords, such as four codewords for a CWI-4. Therefore, in one embodiment, a CWI-4 includes 4 three-byte header fragments, where each three-byte header fragment is protected by a C1' codeword. From these 4 three-byte header fragments, any number of decoding failures is possible from zero to four, e.g., there may be one to four C1' decoding failures in an attempt to assemble the 12-byte header. These C1' decoding failures may result in uncorrected information being present in 3 bytes, 6 bytes, 9 bytes, or 12 bytes of a 12-byte header depending on whether there are 1, 2, 3, or 4 C1' decoding failures in a decoded CWI-4.

In response to CRC error being determined, two options may be pursued in method 800. In the first option, method 800 may include erasing C1 parity bytes associated with the first-written CWI prior to C2 decoding. In the second option, method 800 may include generating a CWI header for the first-written CWI based on the corresponding CWID, computing C1 parity associated with the first-written CWI from the generated CWI header, and overwriting C1' parity obtained from the first-written CWI with the C1 parity.

According to yet another embodiment, method 800 may include assembling an uncorrected CWI header from header fragments associated with all of the one or more C1' codewords of the first-written CWI and correct the CWI header associated with the first-written CWI in response to C1' decoding success, and determining whether a CRC error results from the C1' decoding of the corrected CWI header associated with the first-written CWI.

When a CWI is a CWI-4, then all four header fragments from each codeword within the CWI-4 are gathered together to obtain the CWI header, e.g., for a 12-byte CWI header, each codeword would have a 3-byte header fragment. Moreover, some C1' codewords in a CWI-4 may have decoded successfully, while other C1' codewords may have failed C1' decoding. However, the header fragments from all C1' codewords are required to obtain the CWI header and to compute CRC and check whether the computed CRC agrees with the CRC bytes stored at the end of the header, typically a two-byte value. It is desired that in such a situation, the header fragments coming from failed C1' codewords do not include errors within the header fragment portion, and that the decoding failure is due to too many errors existing within the remaining data or parity portion of the C1' codeword. In these situations, the CWID may be obtained, even from C1' codewords which have failed C1' decoding, in order to place the data in its proper position in the buffer.

There are many benefits to the ability to recover the CWID without successfully decoding the CWI associated therewith. Some of these benefits include: a) efficient recovery of CWID even in the face of errors, b) error-free generation of CWID for first-written CWIDs in a DS from the tape layout algorithm during the read process, and c) improved error-rate performance of iterative hard-decision decoding of C1/C2 product codes.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an ASIC, a FPGA, etc. By executable by the processor, what is meant is that the logic is hardware logic, software logic such as firmware, part of an operating system, part of an application program, etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a CPU, an integrated circuit (IC), a graphics processing unit (GPU), a plurality of hardware components operating together e.g., as in a processing channel, etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system, comprising:
a data processing unit configured to:
read encoded data from a magnetic tape medium;
decode a plurality of codeword interleaves (CWIs) from the encoded data, each CWI being a row in a sub data set logically organized into a two-dimensional array, wherein the array comprises a predetermined number of rows and columns of predetermined lengths; and
determine an address for a first-written CWI without successfully decoding a corresponding codeword interleave designation (CWID) from the encoded data, each CWID specifying an address for a corresponding CWI,
wherein each CWID is calculated as a function of a logical track number and a CWI set number.

2. The system as recited in claim 1, wherein each CWI comprises four interleaved codewords (a CWI-4), and wherein the CWIs are read from the magnetic tape in CWI sets comprising a plurality of CWIs belonging to a data set.

3. The system as recited in claim 2, wherein the data processing unit is configured to store a CWI set number associated with a CWI set to which the first-written CWI belongs based on successfully decoding a CWI header of at least one first-written CWI from the data set to which the first-written CWI belongs, the CWI set number for the first-written CWI being stored in a CWI set number storage accessible to the data processing unit.

4. The system as recited in claim 3, wherein the data processing unit is configured to determine the address for the first-written CWI by:
obtaining the CWI set number associated with the first-written CWI from the CWI set number storage;
generating a CWID corresponding to the first-written CWI based on the CWI set number and a channel number which was used to read the first-written CWI from the magnetic tape medium; and
outputting the first-written CWI and the corresponding CWID.

5. The system as recited in claim 4, wherein the first-written CWI is sent to a buffer manager configured to manage a dynamic random access memory (DRAM) buffer to be stored to the DRAM buffer in a location according to the corresponding CWID.

6. The system as recited in claim 3, wherein the data processing unit is configured to:
determine whether C1' decoding has produced error correction information associated with any of one or more C1' codewords of the first-written CWI;
generate a CWID corresponding to the first-written CWI based on the CWI set number and a channel number which was used to read the first-written CWI from the magnetic tape medium; and
output the first-written CWI and the corresponding CWID.

7. The system as recited in claim 6, wherein, in response to C1' decoding failure, the data processing unit is configured to:
assemble an uncorrected CWI header from header fragments associated with all of the one or more C1' codewords of the first-written CWI; and
determine whether a cyclic redundancy check (CRC) error results from the C1' decoding of the uncorrected CWI header associated with the first-written CWI.

8. The system as recited in claim 7, wherein, in response to CRC error being determined, the data processing unit is configured to erase C1 parity bytes associated with the first-written CWI computed prior to C2 decoding.

9. The system as recited in claim 7, wherein, in response to CRC error being determined, the data processing unit is configured to:
generate a CWI header for the first-written CWI based on the corresponding CWID; and
compute C1 parity associated with the first-written CWI from the generated CWI header; and
overwrite C1' parity obtained from the first-written CWI with the C1 parity.

10. The system as recited in claim 6, wherein the data processing unit is configured to:
assemble an uncorrected CWI header from header fragments associated with all of the one or more C1' codewords of the first-written CWI and correct the CWI header associated with the first-written CWI in response to C1' decoding success; and
determine whether a cyclic redundancy check (CRC) of the corrected CWI header associated with the first-written CWI following C1' decoding of the uncorrected CWI header results in a CRC error.

11. The system as recited in claim 10, wherein, in response to CRC error being determined, the data processing unit is configured to erase C1 parity bytes associated with the first-written CWI computed prior to C2 decoding.

12. The system as recited in claim 10, wherein, in response to CRC error being determined, the data processing unit is configured to:
generate a CWI header for the first-written CWI based on the corresponding CWID;
compute C1 parity associated with the first-written CWI from the generated CWI header; and overwrite C1' parity obtained from the first-written CWI with the C1 parity.

13. A method for determining an address for decoded data, the method comprising:
reading encoded data from a magnetic tape medium using a data processing unit of a magnetic tape drive;
decoding a plurality of codeword interleaves (CWIs) from the encoded data, each CWI being a row in a sub data set logically organized into a two-dimensional array, wherein the array comprises a predetermined number of rows and columns of predetermined lengths; and
determining an address for a first-written CWI without successfully decoding a corresponding codeword interleave designation (CWID) from the encoded data, each CWID specifying an address for a corresponding CWI,
wherein each CWID is calculated as a function of a logical track number and a CWI set number,
wherein each CWI comprises four interleaved codewords (a CWI-4), and
wherein the CWIs are read from the magnetic tape in CWI sets comprising a plurality of CWIs belonging to a data set.

14. The method as recited in claim 13, further comprising storing a CWI set number associated with a CWI set to which the first-written CWI belongs based on successfully decoding a CWI header of at least one first-written CWI from the data set to which the first-written CWI belongs, the CWI set number for the first-written CWI being stored in a CWI set number storage accessible to the data processing unit.

15. The method as recited in claim 14, wherein the determining the address for the first-written CWI comprises:
obtaining the CWI set number associated with the first-written CWI from the CWI set number storage;
generating a CWID corresponding to the first-written CWI based on the CWI set number and a channel number which was used to read the first-written CWI from the magnetic tape medium; and
outputting the first-written CWI and the corresponding CWID.

16. The method as recited in claim 15, further comprising:
determining whether C1' decoding has produced error correction information associated with any of one or more C1' codewords of the first-written CWI;
generating a CWID corresponding to the first-written CWI based on the CWI set number and a channel number which was used to read the first-written CWI from the magnetic tape medium; and
outputting the first-written CWI and the corresponding CWID.

17. The method as recited in claim 16, further comprising, in response to C1' decoding failure:
assembling an uncorrected CWI header from header fragments associated with all of the one or more C1' codewords of the first-written CWI;
determining whether a cyclic redundancy check (CRC) error results from the C1' decoding of the uncorrected CWI header associated with the first-written CWI; and
in response to CRC error being determined, either:
erasing C1 parity bytes associated with the first-written CWI computed prior to C2 decoding; or
generating a CWI header for the first-written CWI based on the corresponding CWID, computing C1 parity associated with the first-written CWI from the generated CWI header, and overwriting C1' parity obtained from the first-written CWI with the C1 parity.

18. The method as recited in claim 16, further comprising:
assembling an uncorrected CWI header from header fragments associated with all of the one or more C1' codewords of the first-written CWI and correct the CWI header associated with the first-written CWI in response to C1' decoding success;
determining whether a cyclic redundancy check (CRC) of the corrected CWI header associated with the first-written CWI following C1' decoding of the uncorrected CWI header results in a CRC error; and
in response to CRC error being determined either:
erasing C1 parity bytes associated with the first-written CWI computed prior to C2 decoding; or
generating a CWI header for the first-written CWI based on the corresponding CWID, computing C1 parity associated with the first-written CWI from the generated CWI header, and overwriting C1' parity obtained from the first-written CWI with the C1 parity.

19. A computer program product for determining an address for decoded data, the computer program product comprising a computer readable storage medium having program instructions embodied therewith, the embodied program instructions being executable by a controller to cause the controller to:
read, by the controller, encoded data from a magnetic tape medium using a data processing unit of a magnetic tape drive;
decode, by the controller, a plurality of codeword interleaves (CWIs) from the encoded data, each CWI being a row in a sub data set logically organized into a two-dimensional array, wherein the array comprises a predetermined number of rows and columns of predetermined lengths; and
determine, by the controller, an address for a first-written CWI without successfully decoding a corresponding codeword interleave designation (CWID) from the encoded data, each CWID specifying an address for a corresponding CWI,
wherein each CWID is calculated as a function of a logical track number and a CWI set number,
wherein each CWI comprises four interleaved codewords (a CWI-4), and
wherein the CWIs are read from the magnetic tape in CWI sets comprising a plurality of CWIs belonging to a data set.

20. The computer program product as recited in claim 19, wherein the embodied program instructions cause the controller to:
store, by the controller, a CWI set number associated with a CWI set to which the first-written CWI belongs based on successfully decoding a CWI header of at least one first-written CWI from the data set to which the first-written CWI belongs, the CWI set number for the first-written CWI being stored in a CWI set number storage accessible to the controller; and
determine, by the controller, whether C1' decoding has produced error correction information associated with any of one or more C1' codewords of the first-written CWI.

21. The computer program product as recited in claim 20, wherein the embodied program instructions executable by the controller to determine the address for the first-written CWI causes the controller to:
obtain, by the controller, the CWI set number associated with the first-written CWI from the CWI set number storage;

generate, by the controller, a CWID corresponding to the first-written CWI based on the CWI set number and a channel number which was used to read the first-written CWI from the magnetic tape medium; and output, by the controller, the first-written CWI and the corresponding CWID.

22. The computer program product as recited in claim 21, wherein, in response to C1' decoding failure, the embodied program instructions cause the controller to:

assemble, by the controller, an uncorrected CWI header from header fragments associated with all of the one or more C1' codewords of the first-written CWI;

determine, by the controller, whether a cyclic redundancy check (CRC) error results from the C1' decoding of the uncorrected CWI header associated with the first-written CWI; and in response to CRC error being determined, either:

erase, by the controller, C1 parity bytes associated with the first-written CWI computed prior to C2 decoding; or generate, by the controller, a CWI header for the first-written CWI based on the corresponding CWID, compute, by the controller, C1 parity associated with the first-written CWI from the generated CWI header, and overwrite, by the controller, C1' parity obtained from the first-written CWI with the C1 parity.

23. The computer program product as recited in claim 21, wherein, in response to C1' decoding success, the embodied program instructions cause the controller to:

assemble, by the controller, an uncorrected CWI header from header fragments associated with all of the one or more C1' codewords of the first-written CWI and correct, by the controller, the CWI header associated with the first-written CWI in response to C1' decoding success;

determine, by the controller, whether a cyclic redundancy check (CRC) of the corrected CWI header associated with the first-written CWI following C1' decoding of the uncorrected CWI header results in a CRC error; and in response to CRC error being determined either:

erase, by the controller, C1 parity bytes associated with the first-written CWI computed prior to C2 decoding; or generate, by the controller, a CWI header for the first-written CWI based on the corresponding CWID, compute, by the controller, C1 parity associated with the first-written CWI from the generated CWI header, and overwrite, by the controller, C1' parity obtained from the first-written CWI with the C1 parity.

24. The computer program product as recited in claim 19, wherein the embodied program instructions executable by the controller to determine the address for the first-written CWI causes the controller to:

obtain, by the controller, a CWI set number associated with the first-written CWI from a CWI set number storage accessible to the controller;

generate, by the controller, a CWID corresponding to the first-written CWI based on the CWI set number and a channel number which was used to read the first-written CWI from the magnetic tape medium; and output, by the controller, the first-written CWI and the corresponding CWID.

25. A system, comprising:

a data processing unit configured to:

decode a plurality of codeword interleaves (CWIs) from encoded data, each CWI being a row in a sub data set logically organized into a two-dimensional array, wherein the array comprises a predetermined number of rows and columns of predetermined lengths; and determine an address for a first-written CWI without successfully decoding a corresponding codeword interleave designation (CWID) from the encoded data, each CWID specifying an address for a corresponding CWI.

* * * * *